Oct. 21, 1952  B. B. CORSON ET AL  2,614,996
PREPARATION OF A SURFICIALLY CALCINED NATURAL CARBONATE CATALYST
Original Filed Dec. 31, 1943
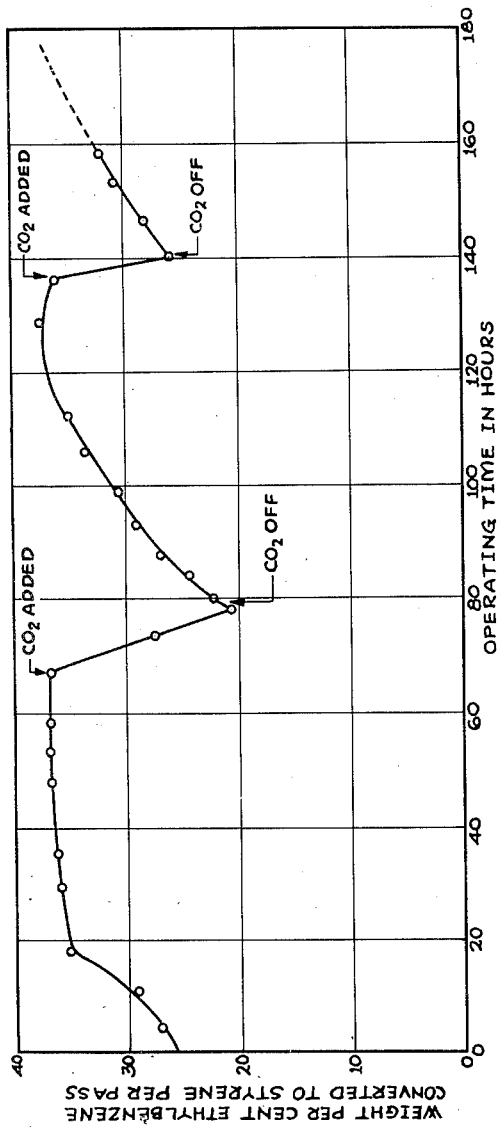
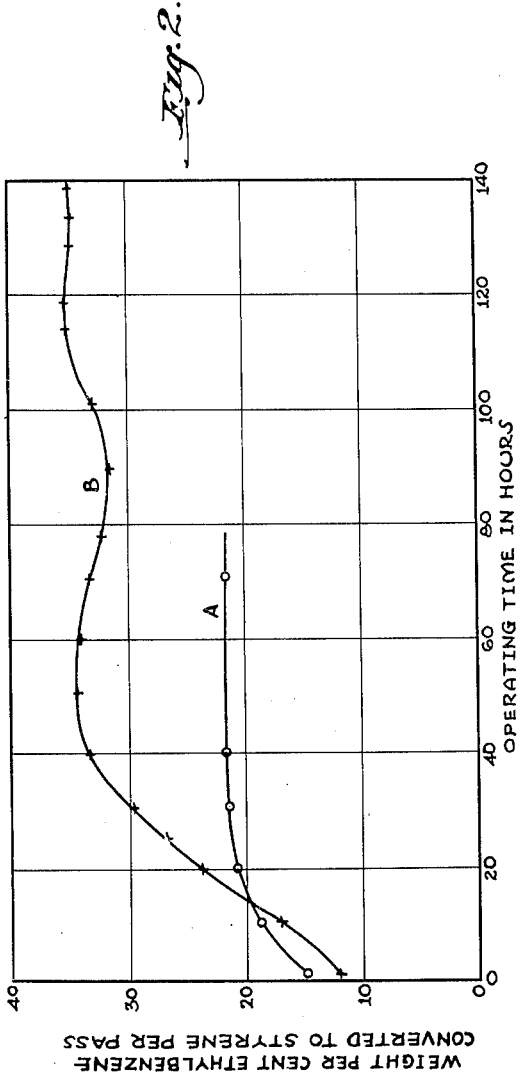
INVENTORS.
Ben Bennett Corson
BY George Arthur Webb
Thomas J. P. O'Brien
ATTORNEY.

Patented Oct. 21, 1952

2,614,996

UNITED STATES PATENT OFFICE 2,614,996

PREPARATION OF A SURFICIALLY CALCINED NATURAL CARBONATE CATALYST

Ben Bennett Corson and George Arthur Webb, Pittsburgh, Pa., assignors to Koppers Company, Inc., a corporation of Delaware Original application December 31, 1943, Serial No. 516,352. Divided and this application September 25, 1947, Serial No. 776,130

2 Claims. (Cl. 252—443)

The present invention relates in general to dehydrogenation catalysts and their composition and comprehends improvements in the catalyst and their composition to adapt them more especially to the dehydrogenation of aliphatics and particularly to the dehydrogenation of the aliphatic side-chains of alkylaromatics having a plurality of carbon atoms in said side chains; for example, the conversion of isobutane to isobutylene and of ethylbenzenes into styrenes.

More particularly the present invention is directed to the method of preparing the catalyst described in our copending application, Serial No. 516,352, filed December 31, 1943, now Patent 2,444,035, of June 29, 1948, of which this application is a division.

An object of the present invention is the provision of improved and less expensive forms of the known catalysts of lime, magnesia, and mixtures thereof for example with, or without, iron oxide for carrying on reactions belonging to the above-stated classes, wherein the catalyst composite comprises a major portion by weight of the carbonates of their metals, calcium and magnesium, and the active catalytic medium comprises the oxide of the metals, as a minor portion by weight of the catalyst composite, whereby the greater structural strength of the carbonate form of the metals predominates in the composite; thus making unnecessary pelleting of the oxide, or supporting the oxide of the metals on extraneous carriers, to provide equivalent sturdiness to the composite, in order to eliminate crushing and packing of the oxide in catalytic use, as hereinafter described.

A further object of improvement is to provide for the present uses easily available natural minerals and other naturally-occurring products that are easily convertible either by pretreatment, or automatically in use, to catalyst composites for for the stated purposes.

A further object of invention is to provide improvements both for the preparation and subsequent operation of catalyst composite of the stated types whereby their physical integrity and effective activity can be assured over importantly prolonged operating periods.

An important feature of the present invention is the provision of a catalyst composite composed of granules of calcium and magnesium calcined at a temperature between 600 and 650° C., since applicants have found, as is hereinafter pointed out, that under identical catalyzing conditions the catalytic conversion with dolomite calcined at 650° C. increased from 22% to 33% over that which obtains with the same dolomite calcined at 920° C.

A further important feature of the present invention is the discovery, as hereinafter also pointed out, that by the use of natural carbonates which upon calcination to constant weight would show a loss of 30–45%, a far superior catalyst results, from the standpoint of providing better yields and catalytic conversions, than is possible with like carbonate rocks which show a loss of as little as 21% by weight upon complete ignition.

The invention has for further objects such other improvements and such other operative advantages or results as may be found to obtain in the processes or apparatus hereinafter described or claimed.

It is known that both lime and magnesia, either individually or in admixture, or containing a fractional proportion of iron oxides, provide good catalysts for dehydrogenation reactions involving especially the aliphatic side-chains of alkylaromatics. The lime and magnesia as usually prepared are either pulverulent or, structurally, highly friable lumps, and their successful use has heretofore necessitated, in order to provide them with the required resistance to crushing and packing demanded in large-scale operations, that these materials be made up as a composite by being formed into pellets or by being supported on structurally sturdy carriers such as active carbon, silica gel, Florida earth, or the like, which also provide the large surface areas whereby said compounds are brought into intimate contact with the aliphatic or alkylaromatic compounds to be dehydrogenated.

It has now been found by the present co-inventors that particularly desirable and rugged forms of lime and magnesia with or without appropriate contents, for example, of iron oxide can be easily prepared by the calcination at the known range of suitable temperatures of surficial portions only of granules of such natural products as marble, limestone, dolomite, dolomite limestone, and the like, as well as certain other natural modifications of said substances containing iron oxide, as will be hereinafter named and particularized. By performing the known calcination of the granular said materials so that the required evolution of carbon dioxide is restricted substantially completely to the outer portions of the granules leaving, as is hereinafter pointed out in Examples No. 1 and No. 2, carbonate cores comprising the major portion by weight of the catalyst article or composite, the high resistance to crushing and the sturdy structure naturally inherent to the carbonate of the limestone, dolomite, et cetera, can be in greater part preserved as a major portion by weight of the granule in the interior cores of the granules and their outer portions will comprise, to a depth determined by the extent of calcination, a minor portion by weight of the granules as a coating of the required catalytic oxide, or oxides, a minor portion by weight of the granules as that is adequately held and supported without other means by the natural carbonate material of the cores themselves, thus providing, relatively simple and cheaply, granule composites of the required lime or magnesia as the vitalizing catalytic material, having as its component for sufficient structural strength a greater mass or weight of the stronger carbonate, rather than the weaker oxide, that they can be used in beds of considerable depth and for relatively prolonged periods without substantial deterioration. Advantageously also, if the outer minor portion by weight of oxide-coatings of the so-prepared composite granules are gradually removed from their inner supporting cores of carbonate constituting the major portion by weight of the composite article, during prolonged operation as may result, for example, from erosion of the vapors of the reaction mixture flowing thereover, it is possible, according to expedients and procedures that will be hereinafter described, even without removing the composite granules from the dehydrogenation reactor, to form new minor quantities of coatings of the oxides on the said granular cores by further calcination-conversion of the material of the cores themselves to said oxides, and such further calcination-conversion can be practically carried on at spaced intervals until theoretically the whole material of the cores is completely converted to oxides for catalytic use.

According to the invention, therefore, organic compounds of the classes represented by isobutane and ethylbenzene are dehydrogenated to give isobutene and styrene, and the like, by flowing said compounds in vapor form admixed with water vapor, and in certain instances with a minor amount of added carbon dioxide, at either subatmospheric, atmospheric, or super-atmospheric pressures, through a reaction zone containing catalytic granules comprising, each a structurally resistant core of the carbonate of calcium, or of magnesium, or mixtures of said carbonates containing or not containing iron oxide, in which, as is hereinafter more particularly pointed out in Examples No. 1 and No. 2, the carbonate cores constituted the greater mass or weight of the catalyst composite granules, and an outer layer of an oxide or mixture of oxides of said metals, that is preferably structurally integral with said core, such a product resulting, for example, from the heating of a granule of such naturally occurring rocks as limestone, dolomite, dolomitic limestone, and ferruginous limestone. These stony materials may also contain, for example, minor proportions of alumina and silica, or other oxides, without important loss of utility for the present purpose; it is, however, undesirable to have any important proportion of their calcium, magnesium, or iron contents in such combination with said alumina, silica, or any other compound, that their oxides are not freely liberated and remain in that form during the calcination and subsequent cooling of said stony materials. A simple criterion of the appropriateness of a said natural rock for the present purpose is its percentage loss of weight upon complete ignition which is indicative of the amount of the oxides of calcium, magnesium, or iron that can be liberated from their carbonates by the calcination step. Good results have been obtained with carbonate rocks that showed a loss of as little as about 21% by weight upon complete ignition, even though their ultimate analyses showed them to contain as much as about 36% by weight of silica. Better yields and conversions to said dehydrogenated organic products have, however, been obtained, in the practice, by catalytically employing granules, as above-described, that resulted from the surficial calcination of those said stony materials which, upon calcination to constant weight (total possible loss upon ignition), showed a loss of from about 30% to 45% by weight.

In the preparation of the catalytic granules of invention, by calcination of natural rocks containing carbonates of lime, magnesia, and the like, the temperature of calcination is of considerable import as to the activity of the oxide in catalysis, the calcination being preferably carried out within the temperature range of about 600–650° C. instead of the 900° C., or above, temperatures usually employed in the art when said rocks are calcined for their complete conversion to lime, magnesia, or mixtures thereof. As is hereinafter further more particularly pointed out, the catalytic efficiency of the oxide is increased from about 22% to 33% by restricting the calcination to 600–650° C., as compared with calcination at 900° C., and catalytic use, under equivalent conditions.

The thickness of the layer of said metallic oxide, or oxides, supported on the carbonate core of the catalyst granules depends, amongst other factors, upon the temperature of calcination and upon the length of time the raw rock granules are treated at said temperature. For the present dehydrogenation reaction, a good catalytic surface condition has been produced in granules of a specific dolomite by calcining the granules at 650° C. for three hours. In the case of a dolomite from another source the best producible catalytic surface condition had not been produced even after twelve hours of calcination at 650° C The duration of the calcination step to achieve the optimum catalytic surface condition for the purpose should be determined empirically for the specific raw rock to be employed. It can in general be said, however, that when the calcination step is performed outside the dehydrogenation reactor apparatus and consequently in the absence of any materials undergoing dehydrogenation, as for example in any heated zone capable of maintaining the rock granules in the stated 600° to 650° C. range of temperatures and of permitting free exit of the evolved gases therefrom, a satisfactory catalyst product can be ordinarily produced in between three to twelve hours in the case of raw carbonate-rock granules that pass through and are retained on, respectively, screens of four and ten mesh. In the cases of dolomites, limestones, and the like, containing also iron oxide, or carbonate of iron, the calcination period can be reduced below that which would otherwise obtain, because the presence of iron assists in the decomposition of calcium and of magnesium carbonates into their oxides and carbon dioxide.

As above indicated, the raw carbonate-rock granules can be converted to the catalyst of invention in the above-prescribed manner before they are installed in the dehydrogenation reactor and before the organic compounds to be dehydrogenated are brought into contact therewith. In other words, the raw carbonate-rock granules can be activated by a "precalcination" step.

The preparation of the instant novel catalyst products is, however, not limited to such "precalcination" step, because substantially the same said products and reactivities thereof can be achieved by surficial calcination of the raw carbonate-rock granules "in situ" in the dehydrogenation reactor by merely flowing thereover steam, or vapors of the organic compounds to be dehydrogenated, or mixtures thereof, that have been preheated to within the 600°–700° C. temperatures range required for dehydrogenation of said organic compounds.

Since the carbonate compounds of the metals calcium, magnesium, and iron show little catalytic activity to promote dehydrogenations of the organic compounds but the oxides of said metals, left as calcination-residuum of said carbonates, are highly effective for the purpose, in those instances, where the raw carbonate-rock granules are catalytically activated "in situ" in the dehydrogenation reactor, it will be found that the full activity of the so-formed catalyst product is not achieved immediately but is progressively attained after a relatively extended induction period. If the activation of the raw-carbonate rock is accomplished by flowing thereover at about 650° C. a mixture of some steam and vapors of the organic compound to be dehydrogenated it will be observed, during the initial period of passing of such vaporous mixture, that little or no dehydrogenation of the employed organic compound will be effected. With continued passage, however, of said vaporous mixture, the dehydrogenation of a relatively minor proportion of the so-passed organic compound will be detected in reaction-products issuing from contact with the carbonate-rock; this inidcates that a small amount of the metallic oxide, or oxides, has been formed on the surface thereof. With further continued passage of said vaporous mixture, the formation of more and more of the oxides is indicated by increasing content of dehydrogenation product of the organic compound in said reaction-products. With continued increase of oxide-formation on the surface of the carbonate-rock, there will ultimately be reached a stage where, if the proportion of employed steam is inadequate, the produced oxide-surface becomes so active that the deposition thereon of carbon, resulting from unwanted incidental side-reactions that are pyrolytically destructive of the employed organic compound and do not represent its wanted mere dehydrogenation product, will soon tend to obscure and eventually will quench the catalytic activity of the formed oxide-surfaces on the carbonate-rock granules. Such quenching of the catalytic activity will eventually necessitate cessation of operation and either treatment of the catalyst granules for removal of the deposited carbon or their replacement by new material.

The present inventors have now found, however, that if the proportion of steam in the mixture thereof with the to-be-dehydrogenated organic compound introduced into the dehydrogenation reactor, is continuously maintained at a level adequate to react with the said deposited carbon according to the water-gas reaction (lime and magnesia are also known catalysts for the water-gas reaction), the catalytic oxide-coatings of the carbonate-rock granules can be maintained effectively free of said carbon and their activity will continue for protracted periods to remain unimpaired for dehydrogenation purposes.

The effective life of the present catalytic material does not, however, depend merely on providing oxide-coatings for the carbonate-rock granules, or on maintaining said coatings during operation substantially free of deposited carbon, for the reason that the carbonate cores, upon which the catalytic material depends for its continued structural integrity, exhibit in the reaction zone, within the effective temperature-range of dehydrogenation, a positive partial pressure of carbon dioxide which can lead to the more or less rapid disintegration of the carbonate core and consequent loss of utility of the catalyst material.

The present improvement therefore further provides, when employing the catalysts of invention, for observance and regulation of the carbon-dioxide partial pressure in the zone of dehydrogenation during divers periods of a cycle of operation. In those instances, where the oxide coatings are formed on the rock-carbonate granules "in situ" in the dehydrogenation reactor, as above described, the rate of flow of vapor thereover must be sufficiently rapid, during the induction or oxide-forming stage, to maintain the partial pressure of carbon dioxide in the reactor atmosphere below at most the decomposition pressure of the carbon dioxide evolved from the employed rock-carbonate granules at the existing reactor temperature; otherwise, there will be no oxide formation and the catalyst product will not develop. During this said induction stage there should also be at all times sufficient proportion of steam in the said flowing mixture of reactants both to form a water-gas with any carbon incidentally deposited on the metallic oxide coatings undergoing formation and also to remove, from the reactor, any so-formed carbon dioxide at a partial pressure less than the carbon-dioxide decomposition pressure of the rock-carbonate; otherwise, any previously formed metallic oxide will be reconverted into the catalytically inactive metallic carbonate. Ultimately, in the cycle of operation, when sufficient of the metallic oxide, or oxides, has been formed on the surface of said granules to produce an effective catalytic-coating thereof, the partial pressure of carbon dioxide in the reactor atmosphere, in the interest of preserving the rock-carbonate cores of the catalyst granules and consequently their rugged structure, must be increased, for example by decreasing the steam component of the catalytically treated mixture of steam and organic compound, to a point where said partial pressure is at least about equal to the carbon-dioxide decomposition pressure of said rock-carbonate at the reactor temperature. If the carbon-dioxide partial pressure in the reactor is allowed much to exceed the decomposition pressure of the carbonate in respect of carbon dioxide, the metallic-oxide coatings will, of course, revert to the catalytically inactive metallic carbonate at a rate corresponding to the degree of excess at which said partial pressure is allowed to obtain.

From the above-recited, it obviously lies within the skill of the operator, by appropriate control of the carbon-dioxide partial pressure in the atmosphere in the dehydrogenation reactor, to form therein from the raw carbonate-rock granules the active dehydrogenation catalyst-product of the invention, to retain it in its active form, to preserve its physical structure through protracted cycles of operation, to maintain it effectively free of carbon deposited thereon by incidentals, unwanted side-reactions, and also to reduce, if necessary, any excessive reactivity thereof.

Manifestly, in those instances where the rock-carbonate granules are "precalcined" outside the dehydrogenation reactor to their wanted activity, it only remains for the operator to provide, in the admixture of steam and organic compound introduced into the reactor, that quantity of the former component which prevents effective deposition of pyrolytic carbon on the catalyst surfaces and also gives a partial pressure of carbon dioxide in the reactor atmosphere that is at least substantially equal to the decomposition pressure of the rock-carbonate in respect of said gas.

The partial pressure of carbon dioxide that should be maintained in the reactor atmosphere at various stages in the above-described operating cycle will vary from application to application and also with the nature of the raw carbonate-rock employed, as is indicated by the following table showing the carbon-dioxide partial pressure, at the dehydrogenation temperature of 650° C., of some natural products that are useful for the present application:

| Material | $CO_2$ Partial Pressure |
|---|---|
| | Mm. Hg |
| Magnesite | 54 |
| Dolomite | 18 |
| Limestone | 3 |
| Ferruginous Dolomite | 75-85 |

Magnesia, as well as that natural mixture of lime, magnesia, and iron oxide formed by the calcination of certain ferruginous dolomites, provide especially reactive dehydrogenation catalysts. However, the raw-rock-carbonates from which they are formed, as shown above, have relatively high partial pressures of carbon dioxide at 650° C. and in the practice it has been found that catalyst-supporting cores of such materials when employing the most practical ratio of steam to organic-compound vapors introduced in the dehydrogenation reactor, are not as easily retained in a structurally stable condition as obtains in the case of the dolomite and limestone cores. This is principally in consequence of the fact that the carbon incidentally deposited, as aforesaid, on the catalyst-surface during operation is insufficient when removed therefrom by means of the water-gas reaction to provide adequate partial pressure of carbon dioxide in the reactor atmosphere completely to prevent substantial decomposition of the magnesite and certain ferruginous dolomite cores during protracted operating periods. In their cases, it has been found advantageous to add to reactants passing to the reactor, carbon dioxide from an outside source, for example combustion-products, in quantity sufficient to provide in addition to that carbon dioxide which is formed by the said low-temperature water-gas reaction, a carbon-dioxide partial pressure in the reactor atmosphere that is at least about the decomposition pressure of carbon dioxide of said carbonate materials.

In the accompanying Fig. 1 of the single drawing forming a part of this specification, there is graphically shown the operative effects that can be obtained by careful observance and control of the carbon-dioxide partial pressure of the reactor-atmosphere when employing an improved catalyst of invention. The single curve of said figure represents the operating effects and results obtained in the employment of a said catalyst that was prepared from dolomite granules of sizes of 4 to 10 mesh. These granules were partially activated by their heating for three hours at about 650° C. after which they were charged into the dehydrogenation reactor, with their so-produced surficial coatings of a mixture of lime and magnesia. Their complete activation was effected "in situ" in said reactor by flowing thereover at a temperature of about 650° C. a preheated stream of mixed steam and vaporous ethylbenzene in the respective ratio by volume of approximately 10:1 while employing a contact time of 0.9 second. Hours of operation are plotted in said figure as abscissae and the percentage conversion, by weight, of ethylbenzene per pass over the heated catalyst is plotted as ordinates.

From an initial conversion to styrene of about 26% by weight of the ethylbenzene brought into contact with the dolomite granules that had been merely precalcined for three hours, the conversion of ethylbenzene to said product increased, after about eighteen hours of the described operation, to about 37%, per pass over the catalyst, and continued at this conversion level for the next about forty-seven operating hours. After about the first twenty-five or thirty hours of the described operation, as shown by the curve of Fig. 1, the catalyst had reached substantially its full activity and continued so to function, without diminution, to the sixty-fifth hour. These results show that with the specific dolomite employed, a mere three-hour precalcination period was insufficient to provide the dolomite granules with their most active thickness of oxide-coating which was later achieved in actual operation. During the said forty-seven-hour operating period, there was substantially no deposition of carbon accumulated on the catalyst surface and the partial pressure of carbon dioxide in the reactor atmosphere was in substantial equilibrium with the decomposition pressure of the dolomite cores of the catalyst in respect of carbon dioxide, and the catalyst retained its rugged structure unchanged throughout said operating period. If the above steam-to-ethylbenzene ratio had been sufficiently greater than that employed to have diluted the water-gas-derived carbon dioxide to a point where its partial pressure was less than the decomposition pressure of the catalyst cores in respect thereof, the catalyst would have lost its sturdy physical structure and, in a time interval corresponding substantially proportionally to the degree of such partial-pressure reduction, would have changed completely, although still active, to a highly friable mixture of lime and magnesia that would rapidly disintegrate and pack and give rise to inoperative resistance to flow of vapors through the reactor. Conversely, if the proportion of steam in the vaporous mixture introduced into the reactor had been so low that pyrolytically formed carbon was either inadequately removed from the catalyst surface by the low-temperature water-gas reaction, or, was even so-removed but at a carbon-dioxide partial pressure in the reactor atmosphere somewhat greater than the decomposition pressure of the catalyst cores in respect thereof, the active lime-magnesia coating of said cores would have been more or less rapidly, respectively, either smothered by carbon or have been converted to the catalytically inactive carbonates of lime and magnesia, and in either event the activity of the catalyst would have soon been lost.

Referring again to the curve of Fig. 1, this urgency of control of the carbon-dioxide partial pressure in the dehydrogenation reactor in the interest of ensuring a long effective life of the catalyst body is forcefully demonstrated. The curve of said figure shows, as above recited, that at the sixty-fifth operating hour and under the stated operating conditions about 37% of the ethylbenzene passed over the catalyst was converted to styrene and that the process system had been in equilibrium for about 35 operating hours. At the end of the sixty-fifth hour, sufficient carbon dioxide from an extraneous source was introduced into the ethylbenzene steam admixture flowing to the dehydrogenating reactor to raise the carbon-dioxide partial pressure of the atmosphere therein to about 35 mm. Hg; i. e., to about twice the decomposition pressure of the dolomite cores of catalyst granules in respect of said carbon dioxide. The efficiency of conversion of ethylbenzene to styrene started immediately to decrease and in twelve hours had been reduced to only about 20% by weight of the treated ethylbenzene in consequence of the conversion of the lime-magnesia coatings of the catalyst granules to their inactive carbonates. Thereafter, the extraneous introduction of carbon dioxide was discontinued and the carbon-dioxide partial pressure in the reactor was decreased, for example, by increasing the proportion of steam in the ethyl-benzene-steam mixture employed until the carbon-dioxide partial pressure in the reactor became less than the decomposition pressure of the dolomite in respect of carbon dioxide, and after about forty additional hours of operation, the activity of the catalyst granules had been completely restored to that obtaining before introduction of the extraneous carbon dioxide. The proportion of steam in said admixture was then restored to the 10:1 ratio originally obtaining and the styrene production was maintained for about twenty hours at the originally high level. Thereafter, the described cycle was repeated, as shown in the final portion of the curve, in confirmation of the above.

The accompanying Fig. 2 shows by means of its two curves the distinction in catalytic activity, for the present purpose, between dolomitic limestone granules that had been calcined at a temperature of about 920° C. and the same dolomitic granules that were surficially precalcined for 12 hours at a temperature of 650° C., the surfaces thereof being further activated and brought to maximum activity "in situ" in the dehydrogenation reactor during actual conversion of ethylbenzene to styrene at 650° C. The curve formed by the line A represents the conversion capacity of the dolomite that was calcined at the higher said temperature whereas the line B shows the activity of the same raw material prepared at the lower said temperature and only surficially calcined. The operating conditions during both run periods were maintained substantially the same; i. e., the conversion temperature of ethylbenzene to styrene was 650° C., the steam-ethylbenzene ratio was 10:1, and the contact time was 0.9 second.

Reference to the above curves clearly shows that in the case of dolomite calcined at a temperature of about 920° C., the conversion of ethylbenzene to styrene through seventy hours of said operation never exceeded more than about 22% by weight of ethylbenzene per pass whereas in the case of the same dolomite surficially calcined at 650° C., the said conversion exceeded that of the former material after about fifteen hours of operation and increased, at about forty hours to about 32–33% and so continued for the remainder of an operating period of 140 hours when operation was discontinued.

As hereinbefore mentioned, a wide variety of minerals, rocks, and other natural products containing carbonates of calcium and magnesium are of utility for the present purpose ranging from pure magnesites, dolomites, dolomitic limestones, limestones, marbles, and also these materials containing impurities such as silica, metallic oxides and especially an oxide, or oxides of iron.

When employing substantially the same operating conditions, the by-weight conversion of ethylbenzene to styrene per pass over surficially calcined magnesite and dolomite is higher than is the case with limestone, and the dolomite is preferable to the magnesite because, even though the magnesite is slightly the more selective for the ethylbenzene conversion, it has such a relatively high decomposition pressure in respect of carbon dioxide within the range of temperatures wherein it is catalytically active to promote said conversion that extraneous carbon dioxide may need addition to the atmosphere of the dehydrogenation reactor to prevent complete disintegration of the magnesite cores of the catalyst granules if prolonged use of that catalyst is an important factor, and also because the surficial coatings of magnesia are less reactive than the lime-magnesia coating provided by a dolomite to promote the low-temperature water-gas reaction whereby pyrolytically-formed carbon is inhibited accumulating on the catalysts' surfaces. Thus the magnesite coatings are more likely to become coated with carbon than are coatings of a mixture of lime and magnesia.

Ferruginous limestones have been found of special merit for the present purpose. Upon surficial calcination, they provide a mixture of the oxides of calcium, magnesium, and iron. They can be prepared according to the invention as catalytic granules of such stable structure and crushing strength that they are useful in large-scale operations. Representative of this latter class of natural products are those found in deposits located at Clinton, New York, and are obtainable in the trade as low-grade iron ores. Materials from this source and known in commerce as Red Fluxes Nos. 1 and 2 are of especial utility, the former containing about 30% $Fe_2O_3$ and the latter about 12% of the same, the remainder being essentially dolomitic limestone and a minor amount of silica. Under essentially the same operating conditions the surficially calcined No. 2 Red Flux granules gave an average conversion of ethylbenzene to styrene of 48% by weight per pass of a 10:1 mixture respectively of steam and ethylbenzene thereover at a conversion temperature of 650° C. whereas the Red Flux No. 1 gave an average conversion of slightly less; that is 42%.

Those surficially calcined granules of limestones, dolomitic limestones, or dolomites that contain essentially no other metallic oxides can be advantageously treated for their increased activity with minor proportions of, for example, iron oxide, or nickel oxide applied in any expedient manner and preferably in a fashion that will obviate slaking of the surficial coatings of the oxides of calcium, magnesium, or both; for example, suspensions of said oxides of iron or of nickel in a non-hydrous medium can be sprayed over the said calcined granules. Similarly, it is also feasible for purpose of increasing the resistance to erosion of said surficial coatings to disperse therein a relatively minor proportion of a salt, or the like, for example a compound of silica, that functions at the temperature of dehydrogenation to form a fibrous skeleton of silicious material therein.

The following examples are illustrative of results that have been obtained in the practice of the invention; in said example, the term "average per cent conversion" indicates the proportion by weight of paraffinic or alkyl aromatic hydrocarbons, in the steam-hydrocarbon mixture, that is dehydrogenated by a single contacting with, or passage over, the employed catalyst under the stated operating conditions whereas the "average total yield" represents the proportion by weight of dehydrogenated product that is producible from a given quantity of the material to be dehydrogenated by repeatedly returning to contact with the catalyst any undehydrogenated portion of said quantity. The examples follow:

*Example No. 1*

Minus four to plus 10 mesh granules of a limestone containing about 6% of silica, 1.2% of $Fe_2O_3$, the remainder being essentially $CaCO_3$, were heated at about 650° C. for about three hours in apparatus permitting free evolution of carbon dioxide, thereby providing on said granules a surficial coating consisting essentially of calcium oxide. Over the so-prepared granular catalyst in reactor apparatus a steam-ethylbenzene mixture containing said components in the ratio of 10:1 by volume was continuously flowed at a temperature of about 650° C. for 90 hours. The average per cent conversion of the treated ethylbenzene to styrene was 36% and the average total yield was 78% by weight, at a contact time of 0.9 second for said mixture. At the end of said 90-hour operating period, the limestone cores of said granular composite catalyst article constituted nearly 60% by weight of the granular composite catalyst article which was still highly effective for the purpose when operation was discontinued. The cooled catalyst contained as a carbon deposit 0.06% by weight of the treated ethylbenzene, and over 90% of the elemental carbon liberated in the reactor apparatus by pyrolytic reaction, was continuously removed as carbon dioxide in the effluent vapors.

*Example No. 2*

A sample of marble chips of mesh sizes minus 4 and plus 10 were heated to 650° C. for three hours while passing thereover steam preheated to said temperature. Thereafter, a steam-ethylbenzene mixture was continuously flowed thereover at a contact time of 0.92 second and at a temperature of 650° C. for 5 days. The average conversion of ethylbenzene to styrene was 35% and the average total yield of styrene was 75% by weight of treated ethylbenzene. At the end of said 5 days of operation, the marble cores of said composite catalyst article constituted about 55% by weight thereof. About 0.25% by weight of the treated ethylbenzene was present as unremoved carbon in the cooled catalyst; about 80% of the formed elemental carbon was continuously removed from the reactor in the effluent vapors.

*Example No. 3*

Raw granules of Red Flux No. 2, hereinabove referred to and its origin described, and containing about 5% $SiO_2$, 12.5% of $Fe_2O_3$, 47% $CaCO_3$, 31% $MgCO_3$, and a small amount of $Al_2O_3$, were introduced into a reactor vessel without any preheating or calcining. A vaporous mixture of steam and ethylbenzene in the ratio by volume of 10:1 was preheated to about 650° C. and immediately flowed into contact with the said granules of Red Flux in said reactor. A stream of the said preheated admixture was continuously flowed without interruption over the catalyst at a temperature of 650° C. for an operating period of 2.75 days while maintaining a contact time thereof with the catalyst of 0.92 second. During this entire period an average of 48% by weight of the ethylbenzene brought into contact with the catalyst was continuously converted to styrene and by continuously recycling unconverted ethylbenzene that was separated from said styrene, an ultimate yield of 74% of styrene was recovered from a given quantity of ethylbenzene.

*Example No. 4*

A granulated dolomitic limestone containing about 11.5% of $SiO_2$, 4.6% $Al_2O_3$, 12% $FeCO_3$, 42% $CaCO_3$ and 28% $MgCO_3$ was screened and the minus 4 and plus 10 mesh sizes were in admixture precalcined at about 650° C. for three hours under conditions permitting free escape of the evolved gas. In the said limestone, the magnesium and calcium carbonates were in the mole ratio of substantially 1:1.3. A vaporous stream that was a mixture of steam and ethylbenzene in the ratio of 10:1 and at a temperature of 650° C. was then continuously flowed over the said precalcined dolomitic granules for a period of 2.75 days. The contact time of said mixture with the superficially calcined said limestone was maintained at 0.92 second. During this entire period an average of 41% by weight of the ethylbenzene in said stream was converted to styrene and by recycling of the unconverted ethylbenzene into contact with the catalyst 71% of a given quantity of ethylbenzene was converted to styrene. The catalyst was still operative to produce styrene at the stated rate when the run was interrupted.

*Example No. 5*

A vaporous admixture of steam and diethylbenzene in the volume ratio of 10:1 and at a contact time of 0.8 second was flowed at a temperature of 650° C. over dolomitic limestone granules (minus 4 to plus 10 mesh) that had been surficially precalcined at a temperature of about 650° C. for about 3 hours. From 240 parts by weight of so-treated diethylbenzene there was obtained 70% by weight of liquid products which contained 52.2%, 19.7% and 9.9% by weight respectively of diethylbenzene, styrene, and divinylbenzene. Recycling of the undehydrogenated diethylbenzene into contact with the catalyst gave as a total yield from a given weight of said compound, 21% of divinylbenzene and 41% of styrene, by weight.

*Example No. 6*

Isopropylbenzene in vapor form diluted with 9 volumes of steam was flowed at 0.9 second contact time over dolomite granules superficially precalcined at 650° C., at a contact time of 0.9 second and at an hourly liquid space velocity of 0.4 and at a temperature of 650° C. From 648 parts by weight of so-treated isopropylbenzene there were obtained 572 parts by weight of condensed liquid products which contained 32.5%, 13.2%, and 31.0% respectively of isopropylbenzene, styrene, and -methylstyrene. Recycling of the unconverted isopropylbenzene to the dehydrogenation zone gave a yield of 46% by weight of methylstyrene from a given quantity of isopropylbenzene.

*Example No. 7*

Granular dolomite of minus four to plus ten mesh was calcined for 3 hours at 650° C. Over the so-treated dolomite at a temperature of 650° C. and at a contact time of 1.0 second a mixture of steam and mono-ethylnaphthalene in the molar ratio of 10:1 was continuously flowed for an operating period of 120 hours. During this time the average per cent conversion of the ethylnaphthalene to vinylnaphthalene was 36.4% by weight. The average total yield was 70.3% by weight of the latter said compound. There was also produced about 3.7% and 4.8% by weight respectively of naphthalene and methyl-naphthalene along with about 2.8% by weight of a gaseous mixture comprising by volume about 92% hydrogen and minor amounts of ethylene and paraffinic compounds. 91% of the elemental carbon liberated in the reactor apparatus was continuously removed therefrom as carbon dioxide in the effluent vapors.

*Example No. 8*

Granular dolomite was partially calcined by heating the same several hours at 650° C. in the presence of an inert gas. A mixture of isobutane and water vapor in molar ratio of 1:5 was then flowed over said calcined granules in reactor apparatus while maintaining their temperature at 650° C., the contact time of said mixture with said granules being 0.4 second. Substantially 20% of the so-treated isobutane was continuously dehydrogenated, about 55% by weight of the so-converted isobutane being isobutylene and the remainder being propylene. Under substantially the same operating conditions but in the absence of water vapor, substantially 20% of the treated isobutane was also dehydrogenated, about 48% by weight being isobutylene and the remainder propylene. In the latter case, however, the activity of the novel catalyst was rapidly lost to the deposition of carbon thereon accompanied by deterioration of its structure.

The present co-inventors, as above set forth, provide important improvements in the art of manufacturing and employing dehydrogenation catalyst compositions. The novel composite catalysts are conveniently and cheaply preparable directly from easily obtainable source materials. They have an improved activity and inherently such rugged structure that they are directly usable in large scale operation without special and expensive preparation, such as pilling and the like, to increase their mechanical strength. Methods of operation are provided whereby this mechanical strength and improved activity can be easily and simply retained in protracted, uninterrupted operation and whereby that usual carbonization of catalysts belonging to the same class, which renders them rapidly inactive, can be effectively impeded.

The invention as hereinabove set forth is embodied in particular form and manner but may be variously embodied within the scope of the claims hereinafter made.

We claim:
1. A process for preparing a dehydrogenation catalyst capable of converting to styrene at least 30 percent of the ethylbenzene passed over it at 650° C. in the presence of an excess of steam and at a contact time of approximately one second which comprises heating to a temperature in the range of about 600° to 650° C. a mass of granules of a naturally occurring ferruginous limestone which shows a loss of about 30 to 45 percent by weight upon calcination to a constant weight, removing from said mass carbon dioxide evolved by the thermal decomposition of said limestone by flowing at least one gas selected from the group consisting of steam and dehydrogenatable hydrocarbons through said mass until a surficial layer of decarbonated material is formed on each granule, and discontinuing removal of carbon dioxide from said mass prior to decarbonation of the major portion of each granule, said major portion constituting the core of said granule.

2. A process for preparing a dehydrogenation catalyst capable of converting to styrene at least 30 percent of the ethylbenzene passed over it at 650° C. in the presence of an excess of steam and at a contact time of approximately one second which comprises heating to a temperature in the range of about 600° to 650° C. a mass of granules of a naturally occuring ferruginous carbonate of calcium and magnesium selected from the group consisting of limestone, dolomite and magnesite and which show a loss of about 30 to 45 percent by weight upon calcination to a constant weight, and forming solely a surficial layer of decarbonated material on each granule by the combination of maintaining the partial pressure of carbon dioxide in said mass below the decomposition pressure of said carbonate by flowing at least one gas selected from the group consisting of steam and dehydrogenatable hydrocarbons through said mass and of discontinuing such treatment of the mass prior to decarbonation of a major portion by weight of each granule, said major portion constituting the core of said granule.

BEN BENNETT CORSON.
GEORGE ARTHUR WEBB.

REFERENCES CITED

The following references are of record in the file of this patent:

UNITED STATES PATENTS

| Number | Name | Date |
|---|---|---|
| 1,634,505 | McCaughey | July 5, 1927 |
| 1,732,381 | Schmidt et al. | Oct. 22, 1929 |
| 1,926,587 | Hansgirg | Sept. 12, 1933 |
| 2,057,402 | Tropsch | Oct. 13, 1936 |
| 2,097,054 | Atwood | Oct. 26, 1937 |
| 2,110,833 | Mark et al. | Mar. 8, 1938 |
| 2,122,787 | Tropsch | July 5, 1938 |
| 2,122,790 | Tropsch | July 5, 1938 |
| 2,194,335 | Tropsch | Mar. 19, 1940 |
| 2,217,009 | Grosse et al. | Oct. 8, 1940 |
| 2,343,295 | Bailie | Mar. 7, 1944 |
| 2,371,809 | Drennan | Mar. 20, 1945 |
| 2,395,875 | Kearby | Mar. 5, 1946 |
| 2,397,218 | Sturgeon | Mar. 26, 1946 |
| 2,444,035 | Corson et al. | June 29, 1948 |

FOREIGN PATENTS

| Number | Country | Date |
|---|---|---|
| 819,701 | France | July 12, 1937 |